United States Patent [19]
Asker

[11] 4,112,451
[45] Sep. 5, 1978

[54] LOW-INERTIA ELECTRONIC SHUTTER

[75] Inventor: Graham Edward Asker, Ware, England

[73] Assignee: Eastman Kodak Company, Rochester, N.Y.

[21] Appl. No.: 780,150

[22] Filed: Mar. 22, 1977

[51] Int. Cl.² ............................. G03B 9/16; G03B 9/62
[52] U.S. Cl. ..................................... 354/258; 354/234; 354/250; 354/268
[58] Field of Search ............... 354/234, 235, 250, 251, 354/256, 258, 260, 268; 335/128; 292/201

[56] References Cited

U.S. PATENT DOCUMENTS

| | | | |
|---|---|---|---|
| 486,397 | 11/1892 | Eastman | 354/253 |
| 2,443,164 | 6/1948 | Harney | 354/253 |
| 3,661,066 | 5/1972 | Ettischer et al. | 354/251 X |
| 3,678,838 | 7/1972 | Huschle et al. | 354/252 |
| 3,685,408 | 8/1972 | Ettischer | 354/50 |
| 3,848,907 | 11/1974 | Shiurila | 292/201 X |
| 3,997,859 | 12/1976 | Miller | 335/128 |

OTHER PUBLICATIONS

Kodak Research Disclosure Nos. 15416, 14753.

*Primary Examiner*—Michael L. Gellner
*Attorney, Agent, or Firm*—D. P. Monteith

[57] ABSTRACT

In a self-cocking impact shutter, an opening blade is held closed prior to shutter actuation by engagement of a releasably held impact driver with a first tab on the opening blade. When the impact driver is released, it encounters a second tab on the opening blade to open the shutter and hold the opening blade in an open position by continued engagement with the second tab. A low inertia closing blade is held open by an electromagnet that attracts an armature carried by a cantilever spring. The cantilever spring is held in engagement with the closing blade by the electromagnet. The shutter is re-cocked by return of the high energy lever to its releasably held position.

3 Claims, 4 Drawing Figures

LOW-INERTIA ELECTRONIC SHUTTER

CROSS-REFERENCE TO RELATED APPLICATIONS

Reference is made to commonly assigned, co-pending U.S. patent applications Ser. No. 780,148, filed Mar. 22, 1977, in the names of Guilford E. Kindig and Chester W. Michatek, and entitled PHOTOGRAPHIC APPARATUS WITH IMPROVED CONTROL OF CAMERA VIBRATION; and Ser. No. 780,149, filed Mar. 22, 1977, in the name of Donald M. Harvey, and entitled IMPROVED PHOTOGRAPHIC APPARATUS FOR USE WITH SELF-PROCESSING FILM UNITS.

BACKGROUND OF THE INVENTION

1. Field of the Invention

The present invention relates to photographic apparatus and more particularly to a self-cocking impact shutter for use in such apparatus.

2. Description of the Prior Art

Photographic cameras having two shutter blades connected by an intermediate spring so that when an impact member moves the first shutter blade to uncover an exposure aperture, the intermediate spring is tensioned to urge the second shutter blade to cover the exposure aperture, are well known in the art. See U.S. Pat. No. 3,661,066 and the above-cited related applications. The above-referenced related applications further disclose the use of a high energy lever to keep the first blade open during the exposure so that the first blade does not rebound to cover the exposure aperture during the exposure. It is also known to employ an electromagnet to hold an armature that is either directly connected to the second blade or connected to an intermediate latch that cooperates with the second blade to hold the second blade open for a time determined by exposure control circuitry and to release the second blade to cover the exposure aperture after the determined time to terminate the exposure. In shutters where the armature is directly connected to the closing blade, the inertia of the closing blade is thereby increased with a consequent increase in the time required to move the closing blade across the exposure aperture thereby rendering the shutter less efficient. In the known shutters employing intermediate latches to hold the closing blade open, the latches have comprised pivotal members which are lightly spring biased so that the armatures carried thereby are moved into contact with the electromagnet when the shutter is cocked to insure positive engagement of the armature with the electromagnet when the electromagnet is energized. Such latches are complicated and therefore costly to manufacture and have associated therewith a characteristic inertia which must be overcome before the closing blade is released. An example of such a latch is shown in U.S. Pat. Application Ser. No. 673,515, filed April 5, 1976 in the name of Hochreiter et al., now U.S. Pat. No. 4,059,836. It is also known to cock such two bladed impact shutters by means of a spring connected to the opening blade to urge the opening blade toward an aperture covering position when the high energy lever is cocked. A problem with such an arrangement is that the cocking spring works against the force of the impact member when the shutter is opened thereby requiring a higher force on the impact member for efficient shutter operation.

It is desirable in a two bladed, self-cocking impact shutter to provide means for insuring that the opening blade does not bounce open in the event that the camera is dropped or jarred. It is known to employ a frictional restraint on the opening blade to prevent this type of shutter bounce. Such frictional restraint must be overcome by the high energy lever when the opening blade is opened thereby necessitating a higher force on the impact shutter.

SUMMARY OF THE INVENTION

It is an object of the present invention to provide a two bladed, self-cocking impact shutter having a closing blade of relatively low mass and a latch cooperating with the closing blade that is of simple construction and has relatively low inertia.

Another object of the invention is to provide such a shutter with improved means for insuring that the opening blade does not jar open when the camera is subjected to shock.

A still further object of the invention is to provide a two bladed, self-cocking impact shutter having a minimum of parts.

A still further object of the invention is to provide such a shutter wherein the force required to be delivered by the impact member in opening the shutter is minimized.

These and other objects of the invention are accomplished by shutter apparatus which includes an opening blade movable between an aperture covering position and an aperture uncovering position to initiate an exposure, a closing blade movable between an aperture uncovering position and an aperture covering position to terminate the exposure, an impact member movable between a cocked position and a released position, a first tab on the opening blade adapted to be engaged by the impact member in its cocked position to cock the shutter and hold the opening blade closed, a second tab on the opening blade adapted to be engaged by the impact member when it moves from its cocked position to its released position to move the opening blade from its aperture covering position to its aperture uncovering position and hold the opening blade in its aperture uncovering position, a spring connecting the opening blade and the closing blade and adapted to urge the closing blade toward its aperture covering position in response to movement of the opening blade to its aperture uncovering position, an electromagnet, and a closing blade latch including an armature carried by a cantilver spring. The cantilever spring is adapted to bias the armature into contact with the electromagnet and to engage an abutment on the closing blade to hold the closing blade open when the electromagnet is energized and to release the closing blade when the electromagnet is de-energized.

DESCRIPTION OF THE DRAWINGS

In the detailed description of the preferred embodiment of the invention presented below, reference is made to the accompanying drawings in which.

DESCRIPTION OF THE PREFERRED EMBODIMENT

Because photographic apparatus is well known, the present description will be directed in particular to elements forming part of, or cooperating more directly with, the present invention. Elements not specifically shown or described herein are understood to be selectable from those known in the art.

Figure 1:
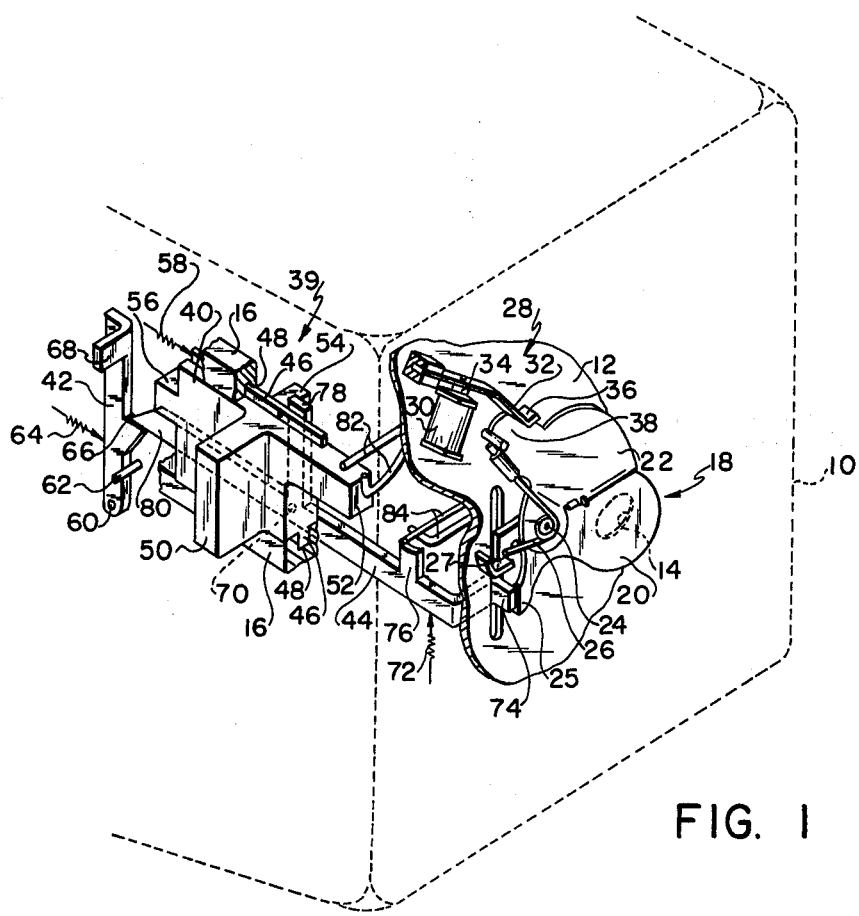
FIG. 1 is a perspective view of a shutter mechanism according to the present invention showing the shutter mechanism in its cocked position.

As seen in FIG. 1, photographic apparatus according to the present invention is contained within a camera housing 10 outlined in phantom. The apparatus includes a camera body having a front portion 12, shown partly broken away, that forms an exposure aperture 14 through which light passes to effect exposure of photographic film (not shown) and a side portion 16. A shutter generally designated 18 includes an opening blade 20 and a closing blade 22 pivotally mounted by means of a pin 24 on front body portion 12. Opening blade 20 and closing blade 22 are coupled by means of a hairpin spring 26. Opening blade 20 is adapted to pivot around pin 24 between a position covering exposure aperture 14 and a position uncovering exposure aperture 14 to initiate an exposure. Closing blade 22 is adapted to pivot about pin 24 from a position uncovering the exposure aperture 14 to a position covering the exposure aperture 14 thus terminating an exposure. Spring 26 is tensioned to bias closing blade 22 toward its closing position when opening blade 20 is moved to its open position.

A releasable latch generally designated 28 includes an electromagnet 30 mounted on the front body portion 12, cantilever spring 32 mounted on an extension of front body portion 12 and an armature 34 carried by the cantilever spring. The distal end 36 of cantilever spring 32 is disposed within the path of an extension 38 of closing blade 22.

A shutter actuation mechanism generally designated 39 includes a body release member 40, a latch 42, and an impact member 44. Body release member 40 is slidably mounted on body side portion 16 by means of rails 46 extending into slots 48 in side body portion 16. Body release member 40 includes an operator accessible extension 50, a nose 52, side extension 54, and a tail portion 56. Spring 58 biases body release member 40 in a forward direction. Latch 42 is pivotally mounted on a pin 60 and is biased in a clockwise direction against a stop 62 by a spring 64. Latch 42 includes a latching surface 66 and an unlatching lug 68. Impact member 44 is pivotally mounted on side body portion 16 by a pin 70 and is urged in a counterclockwise direction by a spring 72. Impact member 44 includes a front impact portion 74, a switch engaging portion 76, an upright extension 78, and a rear latching portion 80.

An electronic exposure control circuit (not shown) in the camera controls electromagnet 30 in response to scene light and is connected to a pair of switches 82 and 84, the function of which will be described below.

The operation of the shutter will now be described with reference to the figures. FIG. 1 shows the shutter mechanism in its cocked position prior to actuation. In this position, extension 54 of body release member 40 is urged against upright extension 78 of impact member 44 by spring 58. The rear latching portion 80 of impact member 44 is in latching engagement with latching surface 66 of latch 42. Switch 82 is the main power switch for the exposure control circuit (not shown).

The nose 52 of body release member 40 engages one of the contacts of switch 82 to keep the switch open. Normally closed, switch 84, when opened, starts the timing of the exposure control circuit to determine the time that the shutter remains open. Opening blade 20 of shutter 18 is held closed by engagement of the front impact portion 74 of impact member 44 with tab 25 on the opening blade. The top edge of opening blade 20 engages the bottom edge of closing blade 22 to hold the closing blade in its open position as shown in FIG. 1. Cantilever spring 32 is lightly biased in a downward direction so that its distal end 36 is brought into engagement with extension 38 on closing blade 22 and armature 34 carried by cantilever spring 32 is urged into contact with electromagnet 30.

Figure 3:
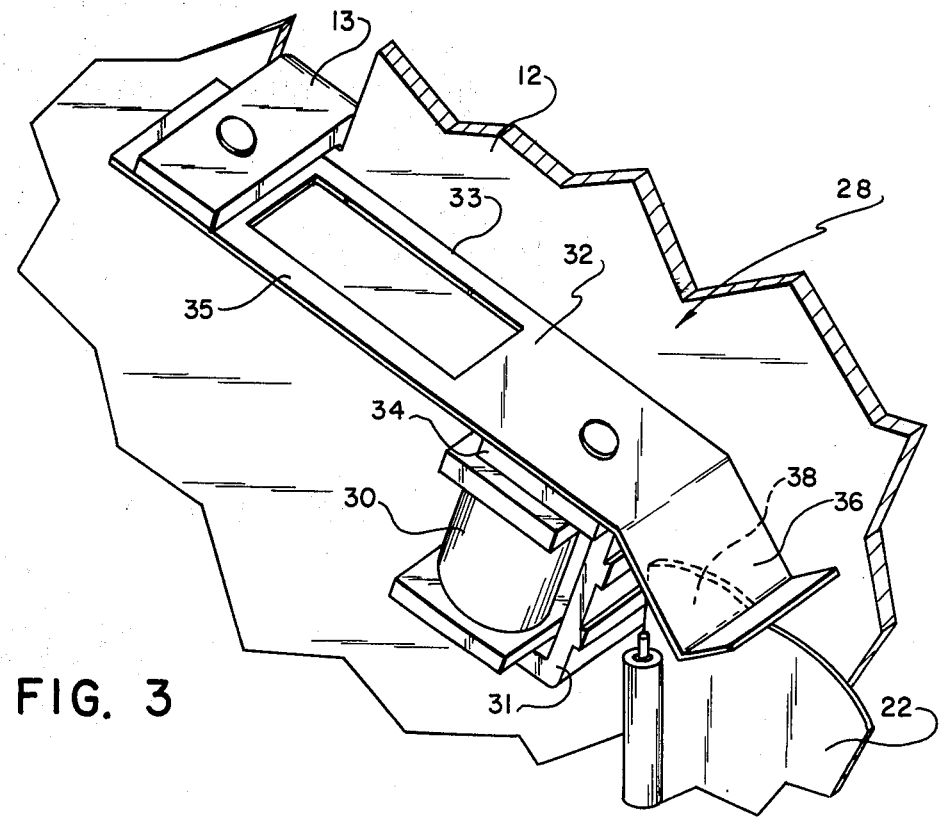
FIG. 3 is a perspective view of the electromagnetic latch associated with the closing blade of the shutter.

As shown in FIG. 3, cantilever spring 32 is mounted on body portion 12 by means of a tab 13 of body portion 12 that is bent perpendicular to the body portion. A central portion of cantilever spring 32 has been removed to leave a pair of narrow support arms 33 and 35 that are relatively flexible in comparison to distal end 36. When electromagnet 30 is energized, armature 34 is drawn into contact with pole piece 31 with sufficient force such that extension 38 of blade 22 is retained in the position shown in FIG. 3 even when spring 26 is tensioned by opening blade 20. Since latch 28 contains no pivotally mounted parts or separate springs, it is of relatively simple and rugged construction and is inexpensive to manufacture.

Figure 2:
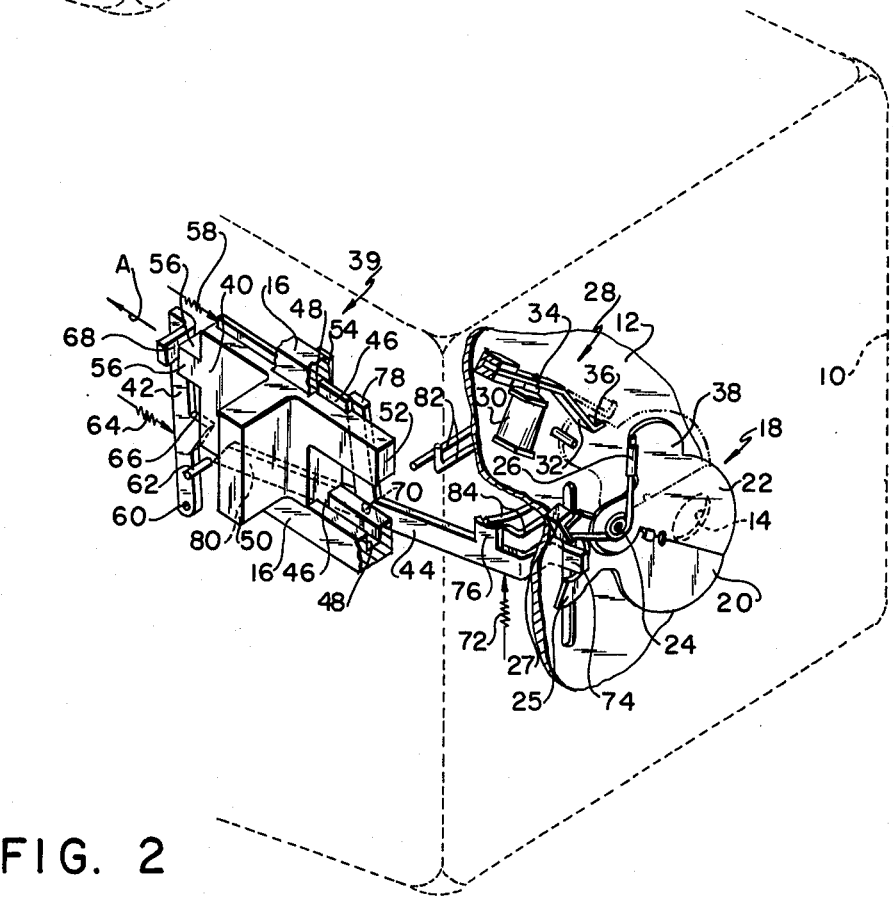
FIG. 2 is a perspective view of the shutter mechanism showing shutter actuation.

As shown in FIG. 2, to operate the shutter, the operator moves body release member 40 in the direction of arrow A against the force of spring 58 by engaging extension 50 of the body release member. As the body release member 40 moves in the direction of arrow A, extension 54 moves out of engagement with the upright extension 78 on impact member 44 and nose 52 moves away from switch 82 thereby allowing switch 82 to close and energize the exposure control circuit. In response to energization, the exposure control circuit applies power to electromagnet 30 thereby drawing armature 34 thereto to hold closing blade 22 in its open position (shown in phantom) by means of engagement of distal end 36 with extension 38 of closing blade 22.

As body release member 40 continues to be moved in the direction of arrow A, the tail portion 56 of body release member 40 encounters unlatching lug 68 of latch 42 thereby rotating latch 42 in a counterclockwise direction against the force of spring 64. As latch 42 rotates in a counterclockwise direction, latching surface 66 thereon releases rear latching portion 80 of impact member 44 to allow the impact member to rotate counterclockwise under the influence of spring 72. Whereupon impact member 44 rotates counterclockwise, front impact portion 74 moving out of engagement with tab 25 on opening blade 20 and switch engaging portion 76 encountering one of the contacts of switch 84 to open timing switch 84 and start the timing cycle of the exposure control circuit. As impact member 44 continues to rotate in a counterclockwise direction, impact portion 74 engages tab 27 on opening blade 20 pivoting the opening blade in a clockwise direction to uncover the exposure aperture and initiate an exposure. While opening blade 20 rotates in a clockwise direction, spring 26 is tensioned to urge closing blade 22 toward its aperture covering position. Front impact portion 74 remains in contact with tab 27 on opening blade 20 to hold the opening blade in its aperture uncovering position and thereby preventing rebound of opening blade 20.

When the electronic exposure control circuit determines that sufficient exposure has been achieved, electromagnet 30 is deenergized thereby releasing armature 34 to allow spring 26 to move closing blade 22 against the slight bias of cantilever spring 32 to its closed position to terminate the exposure.

Figure 4:
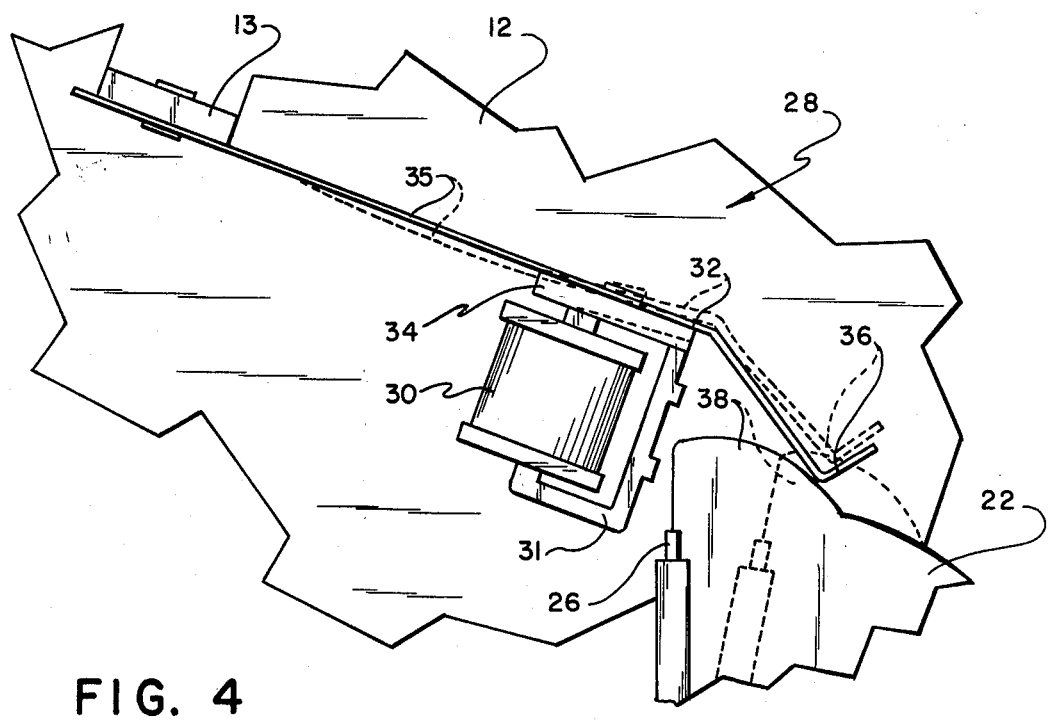
FIG. 4 is a side view of the latch shown in FIG. 3 illustrating the releasing action thereof.

FIG. 4 shows how the closing blade 22 is released from latch 28. As long as electromagnet 30 is energized, the latch is held in the position shown in solid lines. When the electromagnet is deenergized, a point is reached where the force of spring 26 on blade 22 is sufficient to cam extension 38 out from under distal end 36 of spring 32 by moving armature 34 away from pole piece 31. During this movement, flexible support legs 33 and 35 are bowed as shown in phantom, and armature 34 tends to rotate slightly about the arm of pole piece 31 that extends through electromagnet 30. Thus, the only force that must be overcome before blade 22 can escape from latch 28 is the relatively weak force required to bow spring legs 33 and 35 and the inertia in moving armature 34 slightly away from pole piece 31 by slightly rotating the armature as shown in phantom.

The shutter mechanism is cocked when the operator allows body release lever 40 to return under the influence of spring 58 to its rest position as shown in FIG. 1. Latch member 28 returns under the force of spring 64 to rest against stop 62. Switch 82 is opened by engagement of nose 52 with one of the contacts of switch 82 to open the switch 82 and thereby deenergize the exposure control circuit. As body release member 40 is returned to its rest position, extension 54 engages upright extension 78 of impact member 44 to rotate impact member 44 clockwise against the force of spring 72. As impact member 44 rotates in a clockwise direction, switch engaging portion 76 moves out of engagement with switch 84 thereby allowing it to close. As front impact portion 74 moves out of engagement with tab 27 and into engagement with tab 25 of opening blade 20, opening and closing blades 20 and 22 are rotated counterclockwise about pin 24 to their cocked position. Extension 38 of blade 22 slightly lifts cantilever spring 32 against its bias as it moves underneath distal end 36. Finally, the impact member is latched into its cocked position by latch 42 and the mechanism is ready for another exposure.

The invention has been described in detail with particular reference to a preferred embodiment thereof, but it will be understood that variations and modifications can be effected within the spirit and scope of the invention.

I claim:

1. In a photographic camera, an improved shutter of the type having an opening blade movable from an aperture covering position to an aperture uncovering position to initiate an exposure, a closing blade movable from an aperture uncovering position to terminate the exposure, a latch actuatable for releasably holding said closing blade in its aperture uncovering position, and an impact member movable between a cocked position and a released position and adapted to engage a portion of said opening blade upon movement from the cocked position to the released position to move said opening blade from its aperture covering position to its aperture uncovering position, the improvement comprising:

said opening blade including a portion disposed to engage said impact member while in its cocked position to secure said opening blade against inadvertent movement from its aperture covering position; and said latch including a cantilever spring the free end of which is adapted to engage a portion of said closing blade, and an electromagnet operatively coupled to said spring, said electromagnet having (1) a first state in which the free end of said spring is urged into latching engagement with said closing blade, and (2) a second state in which said closing blade is released for movement relative to said spring to its aperture covering position.

2. In a photographic camera, an improved shutter of the type having an opening blade movable from an aperture covering position to an aperture uncovering position to initiate an exposure, a closing blade movable from an aperture uncovering position to an aperture covering position to terminate the exposure, and an impact member movable between a cocked position and a released position and adapted to engage a portion of the opening blade upon movement from the cocked position to the released position to move the opening blade from its aperture covering position to its aperture uncovering position, wherein the improvement comprises:

said opening blade having an extension disposed in the path of said impact member and adapted to be engaged by said impact member upon movement of said impact member from said released position to said cocked position to move said opening blade from said aperture uncovering position to said aperture covering position, and adapted to remain in engagement with said impact member while in said cocked position to prevent said opening blade from opening due to camera shock.

3. In a photographic camera, an improved shutter of the type having an opening blade movable from an aperture covering position to an aperture uncovering position to initiate an exposure, a closing blade movable from an aperture uncovering position to an aperture covering position to terminate the exposure, a latch actuatable by an electromagnet by releasably holding said closing blade in said aperture uncovering position, and an impact member movable between a cocked position and a released position and adapted to engage a portion of the opening blade upon movement from the cocked position to the released position to move the opening blade from its aperture covering position to its aperture uncovering position, wherein the improvement comprises:

(1) said opening blade having an extension disposed in the path of said impact member and adapted to be engaged by said impact member upon movement of said impact member from said released position to said cocked position, to move said opening blade from said aperture uncovering position to said aperture covering position and adapted to remain in engagement with said impact member while in said cocked position to prevent said opening blade from opening due to camera shock; and (2) said latch including a cantilever spring having a fixed end and a free end, said free end being adapted to engage a portion of said closing blade, and an armature carried by said cantilever spring and adapted to be attracted by the electromagnet to urge said spring into latching engagement with said closing blade when said magnet is energized and to release said closing blade when said electromagnet is de-energized.

* * * * *